United States Patent [19]
Ansberry et al.

[11] Patent Number: 5,715,392
[45] Date of Patent: Feb. 3, 1998

[54] METHOD FOR MANAGING VISUAL TYPE COMPATIBILITY IN A CONFERENCING NETWORK SYSTEM HAVING HETEROGENEOUS HARDWARE

[76] Inventors: Catherine Malia Ansberry, 16912 NE. 107th St., Redmond, Wash. 98052; Todd W. Fuqua, 1637 220th Pl. NE., Redmond, Wash. 98053

[21] Appl. No.: 387,503

[22] Filed: Feb. 13, 1995

[51] Int. Cl.[6] ................................................. H01J 13/00
[52] U.S. Cl. .................... 395/200.2; 395/200.04; 395/500; 364/266.6; 364/DIG. 1
[58] Field of Search ..................... 395/162, 200.04, 395/200.2, 500; 364/266.6, DIG. 1

[56] References Cited

U.S. PATENT DOCUMENTS 5,257,350  10/1993  Howard et al. ..................... 395/162

OTHER PUBLICATIONS

Huang et al., "Nondistributed Multiparty Connection Establishment for Broadband Networks," SUPERCOMM/ICC '92: Discovering a New World of Communications, pp. 1392–1396, 1992.

*Primary Examiner*—John E. Harrity
*Attorney, Agent, or Firm*—Ingrid M. Foerster; Andrew J. Dillon

[57] ABSTRACT

A conference enabled X windows networking system using a method for determining the best match available for a conference owner's visual type is disclosed. In the system, the enabler determines if the visual type detected in the X protocol stream is the conference owner's default visual type, in which case it is matched to the participant's default visual type. If that is not the case, the system determines if a visual type is available on the participant which is compatible to that being referred to in the X protocol. If so, the system determines which of the compatible visual types is the best match to that being used by the application. If there is an exact match of compatible visual type, the system matches the participant's visual type to that of the conference owner. If there are no compatible matches, the system will determine if an incompatible match exists between the participant's available incompatible visual types and the visual type being used in the X protocol. If there are no incompatible visual type available, the system signals an error condition and takes the appropriate action. When a match is made between a participant's visual type and that of the conference owner, the matched visual types are removed from the lists of available visual types.

9 Claims, 3 Drawing Sheets

METHOD FOR MANAGING VISUAL TYPE COMPATIBILITY IN A CONFERENCING NETWORK SYSTEM HAVING HETEROGENEOUS HARDWARE

CROSS-REFERENCE TO RELATED APPLICATION

The present application is related to U.S. patent application Ser. No. 08/387,500, entitled *Method and System For Switching Between Users In A Conference Enabled Application* (Attorney Docket No. SA9-94-005) now U.S. Pat. No. 5,557,725, U.S. patent application Ser. No. 08/387,502, entitled *Method For Managing Top-Level Windows Within A Conferencing Network System* (Attorney Docket No. SA9-94-077), U.S. patent application Ser. No. 08/387,501, entitled *Management And Classification of Events For An X Windows Conferencing Enabler* (Attorney Docket No. SA9-94-046), U.S. patent application Ser. No. 08/387,504, entitled *Method To Support Applications That Allocate Shareable Or Non-Shareable Colorcells In A Conferencing Network System Having A Heterogeneous Hardware Environment* (Attorney Docket No. SA9-94-122), U.S. patent application Ser. No. 08/387,505, entitled *Method For Managing Pixel Selection In A Network Conferencing System* (Attorney Docket No. SA9-94-123), U.S. patent application Ser. No. 08/387,506, entitled *Method And Apparatus For Translating Key Codes Between Servers Over A Conference Networking System* (Attorney Docket No. SA9-94-124) now U.S. Pat. No. 5,640,540, all filed of even date herewith by the inventors hereof and assigned to the assignee herein, and incorporated by reference herein.

BACKGROUND OF THE INVENTION

1. Technical Field

The present invention relates generally to video display management over a networking system and more specifically, to a networking system having conferencing capabilities to allow conferenced applications to compensate for differences in visual types between conference servers. Additionally, the present invention relates specifically to a method for classifying pairs of visual types as compatible and incompatible in a networking system using heterogenous hardware.

2. Description of the Related Art

X Windows provides distributed client/server support for two dimensional graphics support. The X server manages the display of two dimensional graphics within windows on behalf of the application. The X Window conferencing enabler appears to the application to be an X server, while at the same time appearing to the X server as an application. The X Windows conferencing enabler then connects to multiple X servers on behalf of the application, displaying the application's windows on each display. The application is not aware that it is being displayed on multiple X servers. Such a networking system is fully described in commonly assigned patent application *A Method And System For Switching Between Users In A Conference Enabled Application*, Ser. No. 08/387,500, now U.S. Pat. No. 5,537,725 incorporated herein by reference for all purposes.

In the absence of a conferencing enabler, the application connects to an X server and communicates with it using X protocol, and asks the X server to create resources such as X windows on the server. In addition, the X server has resources that it has defined that may be used by any application that is connected to that server. In general, resources that are created by the server are those that describe the environment of that server. Many of these resources are provided to the application when it initially connects to the X server. X server defined resources include a defined set of visual types that indicate the ways that the server may be used to display colors. Every application that creates a window to display graphics on that server must use one of these types. Every X server indicates which of these visual types is its default visual type.

The X protocol defines a set of characteristics of visual types used by vendors. Any vendor's implementation of the X server may chose to support a subset of these visual types, and may chose to support different subsets of these visual types based on the hardware (specifically, the graphics adaptor) available to that X server. Therefore, a robust X windows application should be able to determine the visual types available to it and select the most appropriate visual type for that application.

By way of definition, a visual type consists of three characteristics defined by the X protocol. These characteristics are:

1. Depth

That is, the number of bit planes available for the display of each pixel. The X protocol, as well as current graphics technology, defines a limit of 24 bits of depth. By far, the most common depths are 1, 8 and 24.

2. Visual class

X Windows defines six possible visual classes: StaticGray, GrayScale, StaticColor, PseudoColor, DirectColor and TrueColor. The precise details of these classes do not need to be defined here. At a minimum though, three of these visual classes enable an application to change the colors available to it, and three of them require the application to use the colors that the X server has predefined. That is, StaticGray, StaticColor and TrueColor create colormaps that are "read only", while the other visual types create colormaps that are "read/write."

3. Number of available entries

This indicates the number of independent colors that the server can make available to an application at one time.

Every X server defines to each application the precise visual types that it supports. Each visual type definition includes a value for the depth, visual class and number of available entries for that type.

A problem arises when the X Windows conferencing enabler connects to X servers that differ in their available visual types. When the application connects to the conferencing enabler, the enabler must inform that application which visual types are available. From that point forward, the application must be able to use any or all of those visual types. This must be true, even if another X server with significantly different visual types joins a conference after the application has been made aware of its available visual types. If, in the course of execution an application in a conference attempts to use a visual type or a characteristic of a visual type that is not available on an X server in that conference, that X server will not execute the requested action. If the X conferencing enabler does not compensate for the differences in visual types in a conference, applications would not be able to run within a conference in which the X servers were not identical in their support of visual types.

Accordingly, what is needed is a method for enabling an X Windows conferencing enabler to compensate for differences in visual types between X servers. Specifically, the X conferencing enabler may determine the best mapping available between visual types such that X windows applications run in conferences in which the X servers in that conference differ in their support of visual types.

What is also needed is a method for classifying pairs of visual types as compatible and incompatible to allow the conference enabler to support X windows applications in conferences that involve X servers that differ in their support of visual types and to detect when an X server in the conference has encountered a sever error as a result of the differences in visual types.

SUMMARY OF THE INVENTION

It is therefore one object of the present invention to provide video display management over a networking system.

It is another object of the present invention to provide a networking system having conferencing capabilities to allow conferenced applications to compensate for differences in visual types between conference servers.

It is yet another object of the present invention to provide a method for classifying pairs of visual types as compatible and incompatible in a networking system using heterogenous hardware.

The foregoing objects are achieved as is now described. According to the present invention, a conference enabled X windows networking system using a method for determining the best match available for a conference owner's visual type is disclosed. In the system, the enabler determines if the visual type detected in the X protocol stream is the conference owner's default visual type, in which case it is matched to the participant's default visual type. If that is not the case, the system determines if a visual type is available on the participant which is compatible to that being referred to in the X protocol. If so, the system determines which of the compatible visual types is the best match to that being used by the application. If there is an exact match of compatible visual type, the system matches the participant's visual type to that of the conference owner. If there are no compatible matches, the system will determine if an incompatible match exists between the participant's available incompatible visual types and the visual type being used in the X protocol. If there are no incompatible visual types available, the system signals an error condition and takes the appropriate action. When a match is made between a participant's visual type and that of the conference owner, the matched visual types are removed from the lists of available visual types.

The list of visual types is created when the X server responds to a connection request from the X server conferencing enabler. To determine the default/compatible/incompatible state of visual types available on a participant's X server, the system compares the characteristics of the conference owner's visual type being used to those of each of the participant's visual types. The visual types are compatible if the conference owner's visual type has a greater number of independent entries and the participant's visual type is read only. In addition the visual types are compatible if the conference owner's visual type-has the same number or fewer independent entries than that of the participant and the conference owner's type is read/write. Finally, they are compatible if the conference owner's visual type has fewer independent entries than that of the participant, and both the conference owner's visual type and that of the participant are read only.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

A representative conference enabled network system is described in commonly assigned U.S. patent application Ser. No. 08/387,502, entitled *Method For Managing Top-Level Windows Within A Conferencing Network System*, incorporated herein by reference for all purposes. When an application connects to the X Windows conferencing enabler, the enabler then attempts to connect to each X server in the conference on behalf of that application. If the connection is successful, each X server sends a reply to the enabler that includes a list of all of the visual types supported on that X server. The conferencing enabler then stores the lists of available visual types for each X server in the conference, and returns the reply to the application that contains the list that was received from the conference owner. At this point the application believes that it has all of the visual types of the conference owner available to it.

When the conferencing enabler detects an X protocol (step 106) that contains a reference to a visual type (step 108), the X conferencing enabler must select a visual type on each X server that best matches the requested visual type. The X conferencing enabler compares the list of available visual types for each X server in the conference with that of the conference owner and executes the following method depicted in the flowchart of FIG. 1 to determine the best match that is available for the conference owner's visual type.

In step 110, the enabler determines if the visual type to be matched is the conference owner's default visual type, and if so, in step 112, then it should be matched to the default visual type of the conference participant's X server. Otherwise, in step 114, if there is an available visual type on the conference participant's X server that is compatible to the conference owner's visual type, in step 116, the best compatible visual type should be used (step 124 or 126). If not, in step 118, if there is an available incompatible visual type on the conference participant's X server, in step 120, the best incompatible visual type on the participant's X server should be matched to the conference owner's visual type. Once a match is made (steps 112, 129, 126), the system removes the matched visual types from the list of available visual types in step 128 before returning to step 106.

If, in step 118, it is determined that there are no incompatible visual types available (and therefore no available visual types at all), then the application cannot be run with this X server in the conference. The conferencing enabler then, in step 122, determines what the appropriate action is in this error condition. It may be that this participant's X server will no longer be permitted to interact with the application.

Figure 1:
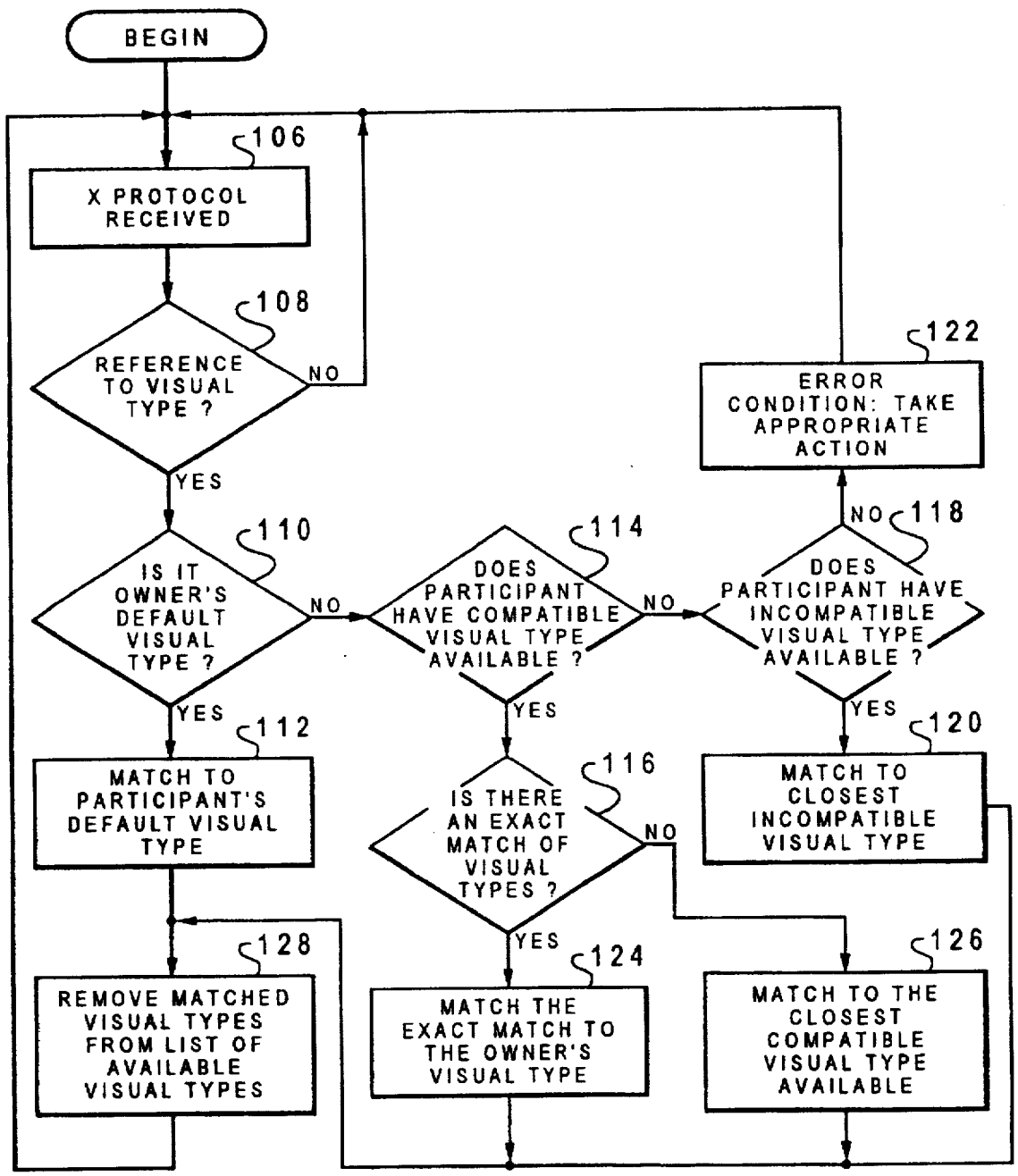
FIG. 1 depicts in accordance with a preferred embodiment of the present invention a flowchart depicting the method to determine the best match that is available for the conference owner's visual type.

Another way of looking at the implementation of FIG. 1 is to place all of the available visual types on the conference participant's X server are placed into one of three categories:

1. default visual
2. compatible visual types
3. incompatible visual types

Figure 2:
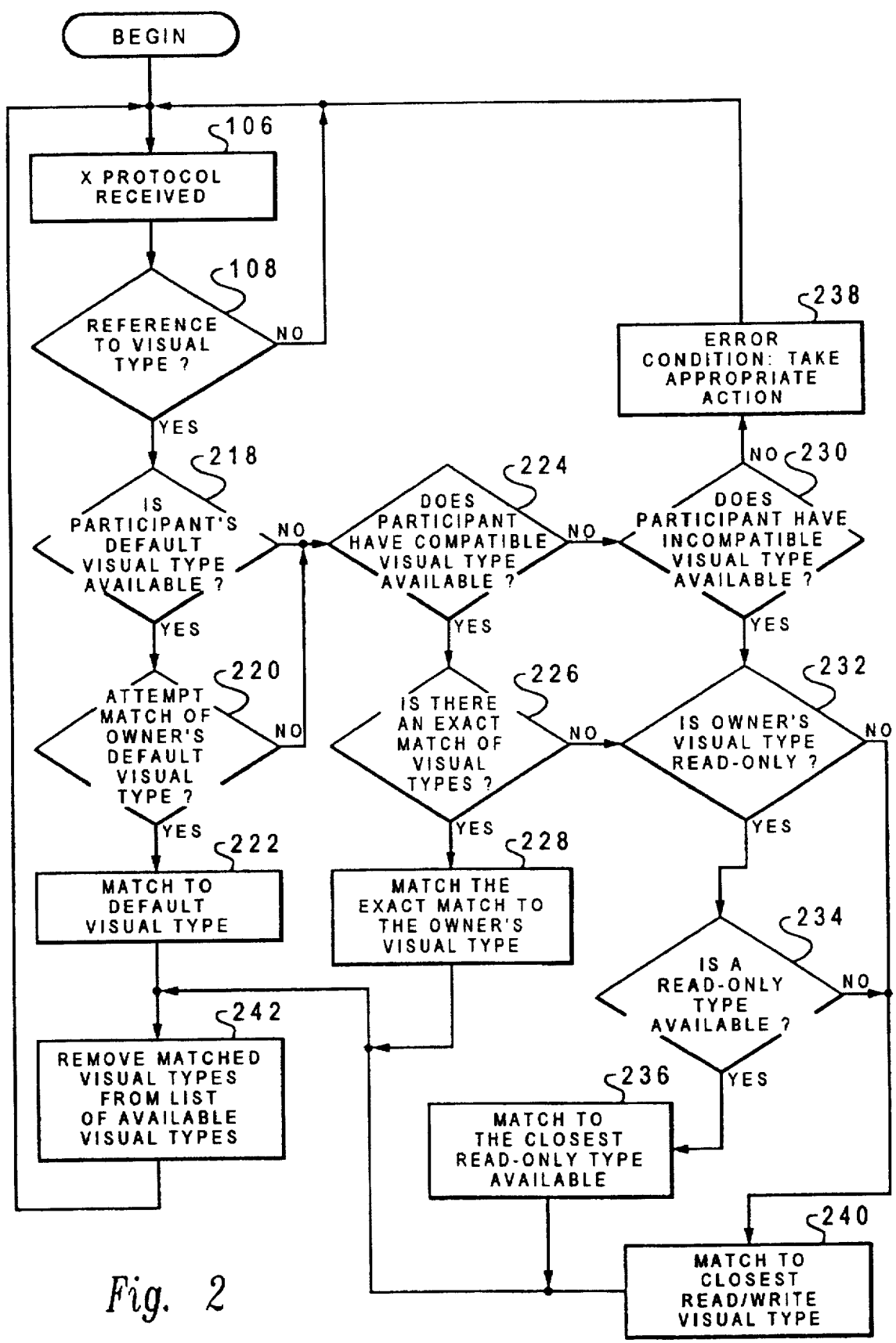
FIG. 2 is depicts a flowchart illustrating the alternative implementation in accordance with a preferred embodiment of the present invention.

These categories are examined in the order stated here. If a category is found that is non-empty, the visual type within that category that best matches the conference owner's visual type is used. Once an available visual type is matched with one on the master's X server, it is removed from the list of available visual types. FIG. 2 depicts a flowchart illustrating the alternative implementation.

If, in step 218, the default visual category is not empty and the application, in step 220, is attempting to use the conference owner's default visual type, then, in step 222, the match is made between the default visual types.

If, in steps 224 or 230, one of the other categories is determined to be appropriate and there is more than one possible visual type within that category, then the method proceeds to steps 226 or 232 to determine the best visual type within that category. Otherwise, in step 238, there is an error condition.

In step 226, the system determines if there is an exact match between the conference owner's visual type and the participant's visual type, then match these two visual types (step 228). If not, in step 232, the system determines if the conference owner's visual type is read only, and if so, in step 234, the system selects the closest visual type (as defined below) that is also read only (step 236). If this is not possible, then, in step 240, the system selects the closest visual type (as defined below) that is read/write. Once a match is made, it is removed from the list in step 242.

For the purposes of this embodiment in FIG. 2, the "closest" is determined by the values assigned by the X protocol for each of the visual types. That is, the X protocol defines each of the visual types a numerical value as follows:

|  | numerical value | read only? |
| --- | --- | --- |
| StaticGray | 0 | y |
| GrayScale | 1 | n |
| StaticColor | 2 | y |
| PseudoColor | 3 | n |
| TrueColor | 4 | y |
| DirectColor | 5 | n |

When more than one visual type is determined to be the "closest" to the visual type to match, the visual type that has the higher numerical value is considered to be the best match.

Since visual types are contained in both requests from the application and replies sent from the X server, a visual type is considered to be "used" by the application if it is referred to in either a request or reply. For this reason, it is important that each visual type used by an application be mapped to one and only one visual type on each X server's visual type and the visual type referred to by the application, those visual types may not be matched to any other visual type.

As stated above, the default visual type of the conference owner is always matched to the default visual type of each X server in the conference. This is important because of the structure of the X protocol. That is, the default visual type is provided to the application so that the application may entirely avoid taking advantage of the special characteristics of the visual types. It allows the application not to specify the details of color handling in several of the X protocol. If an application chooses to use the default visual type, this indicates that it will not be providing some information to the X server, but rather that it allows the X server to use its default values. Since this information is dispersed throughout the X protocol, it greatly simplifies the X conferencing enabler to assume that the default visual types are always matched to each other.

Another consideration is that the visual types are matched on a per-application basis. That is, the best match of visual types is determined when it is first referred to by the application, rather than determining the best match of visual types when the connections to the X servers are initially established. This allows the conferencing enabler to provide the best possible match for each application in the conference, thus providing a higher probability that each application will be able to execute cleanly in the conference.

Once it is determined that either the compatible visual type category or the incompatible visual type category has more than one potential match, it is significant that within that category, the visual type that is chosen has the same read/write characteristics as the visual type that is being matched. This is important because once an application has selected a visual type—be it a read only visual type or a read/write visual type—subsequent protocol used by the application assumes that capability of the visual type. It is difficult, although not impossible, to compensate for this type of difference in visual types. Therefore, it is desirable for the X conferencing enabler to avoid this difficulty.

Once that visual type matching is defined by the conferencing enabler and the application is able to use the visual type of its choice, it is possible that errors may occur on any or all of the X servers in the conference as a result of the application using the characteristics of that visual type. These errors may arise either because the application itself is in error or because one or more of the X servers are in a state such that the request may not be granted. Depending upon the visual type matching performed by the conferencing enabler, these errors may or may not be reasonably expected by the application. That is, based on the visual type used by an application, that application should reasonably be able to deal with certain errors from the X server. Other errors that may be generated by an X server that does not have a visual type identical to that which the application believes it is using, may not be expected by the application. Sending these errors to the application could cause it to behave in an unpredictable manner.

As an application in a conference uses visual types, the conferencing enabler is able to determine which of the visual types available on each of the X servers in the conference is the best match to the one requested by the application. As part of the process of determining which visual type is the best match, each visual available is classified as either compatible or incompatible with the visual type requested by the application.

Compatible and incompatible visual types are differentiated by the potential differences in their response to client requests to use colors. The conference enabler defines an incompatible visual type as one that might generate an error that the application does not expect. Conversely, a compatible visual type is one that does not generate an error that the application cannot reasonably expect. Note that the difference is not the visual types' ability to return an error in response to an application request. Indeed, an error may be an appropriate response to an invalid request or may be an appropriate and expected response from an X server that is not able to execute the application's request. The difference between compatibility and incompatibility lies in whether or not the application could reasonably be expected to handle the error that the X server may return.

If an error is received from an X server with an incompatible visual type, the conferencing enabler must detect this condition and take appropriate action; however, the error should not be sent on to the application.

There are two characteristics of visual types that determine whether or not two visual types are compatible. These are the number of entries in a colormap of the visual type and whether or not the entries in the colormap are modifiable by the application.

In order to understand why the ability to modify the colormap of the visual type is a characteristic determining compatibility, the system must first examine the behavior of the X server when a modifiable visual type is being used. As stated earlier, there are six visual classes supported by X windows. Of these six classes, three of them allow an application to change the entries in the associated colormap (that is, they allow entries in the colormap to be allocated as read/write or read only) and three of them do not. These classes are separated as follows:

| read only | read/write |
|---|---|
| StaticGray | GrayScale |
| StaticColor | PseudoColor |
| TrueColor | DirectColor |

Through the X protocol, an application has an option of allocating an entry in the colormap as either read only or read/write. The behavior of the X server in response to a request to allocate an entry differs based on the visual type which is being used. The conditions are summarized in the following table:

TABLE 1

Summary of visual type responses to an application request to allocate an entry in its colormap.

| | server response to read only allocation attempt | server response to read/write allocation attempt |
|---|---|---|
| READ ONLY visual types | Closest available pixel allocated. Never an error. | Always an error. |
| READ/WRITE visual types | Exact pixel allocated or error if colormap is full. | Exact pixel allocated or error if colormap is full. |

The underlying principle of compatibility of visual types is that two visual types are compatible while involved in a conference if and only if they do not generate errors which the application cannot reasonably expect to encounter. For instance, an application that believes it is using a read/only visual type (e.g., StaticColor) and issues a request to allocate a read/only entry in the colormap cannot reasonably expect to get an error stating that the colormap is full. Therefore, read/write visual types on an X server are incompatible with read/only colormaps of the application.

This compatibility principle leads to the following matrix in Table 2, displaying the compatibility of visual types that are used by the application and each X server in a conference. Note that since the issue of relative number of independent entries in a colormap will be dealt with in the following section, this matrix applies only to the situation when the X server's visual type has an equal or greater number of entries than that expected by the application.

Those positions marked with an "X" indicate pairs of compatible visual types. All other pairs are incompatible.

TABLE 2

Visual types that are compatible when the application's visual type has the same number or fewer number of independent entries as that of the X server.

| X SERVER VISUAL TYPE: | Static Gray | Gray Scale | Static Color | Pseudo Color | True Color | Direct Color |
|---|---|---|---|---|---|---|
| APPLICATION VISUAL TYPE: | | | | | | |
| Static Gray | X | | X | | X | |
| Gray Scale | X | X | X | X | X | X |
| Static Color | X | | X | | X | |
| Pseudo Color | X | X | X | X | X | X |
| True Color | X | | X | | X | |
| Direct Color | X | X | X | X | X | X |

The number of entries in a colormap of a visual type is the second indicator of compatibility of two visual types. consider the case of an application that creates its own colormap of visual type, A. When the application creates this colormap, it is aware of the fact that visual type A allows a certain number of entries. For example, assume that visual type A is a read/write visual type, which allows 4096 independent entries in its colormap. At this point, if the application should so choose, it should be able to allocate 4096 independent entries in this colormap that it created. Now, suppose the conferencing enabler had determined that the best match for visual type A available on a certain X server was visual type B, which is a read/write colormap with only 256 independent entries. When the application attempted to allocate more than 256 entries in its colormap, the second X server would generate an error. This would be an error that could not reasonably be expected by the application and therefore indicates that these two visual types are incompatible.

Note that, as previously described, a read only visual type never returns an error because it could not allocate an entry in its colormap. Therefore, the number of independent entries in a visual type will only impact the compatibility of visual types that are modifiable.

Table 3 below shows a matrix that defines the compatibility of visual types when the application assumes that it has a greater number of independent entries in its colormap than the X server actually has available.

Those positions marked with an "X" indicate pairs of compatible visual types.

TABLE 3

Visual types that are compatible when the application's visual type has a greater number of independent entries than that of the X server.

| X SERVER VISUAL TYPE: | Static Gray | Gray Scale | Static Color | Pseudo Color | True Color | Direct Color |
|---|---|---|---|---|---|---|
| APPLICATION VISUAL TYPE: | | | | | | |
| Static Gray | X | | X | | X | |
| Gray Scale | | X | | X | | X |
| Static Color | X | | X | | X | |
| Pseudo Color | | X | | X | | X |
| True Color | X | | X | | X | |
| Direct Color | | X | | X | | X |

In algorithmic form, Tables 2 and 3 can be used to create lists of compatible and incompatible visual types.

Figure 3:
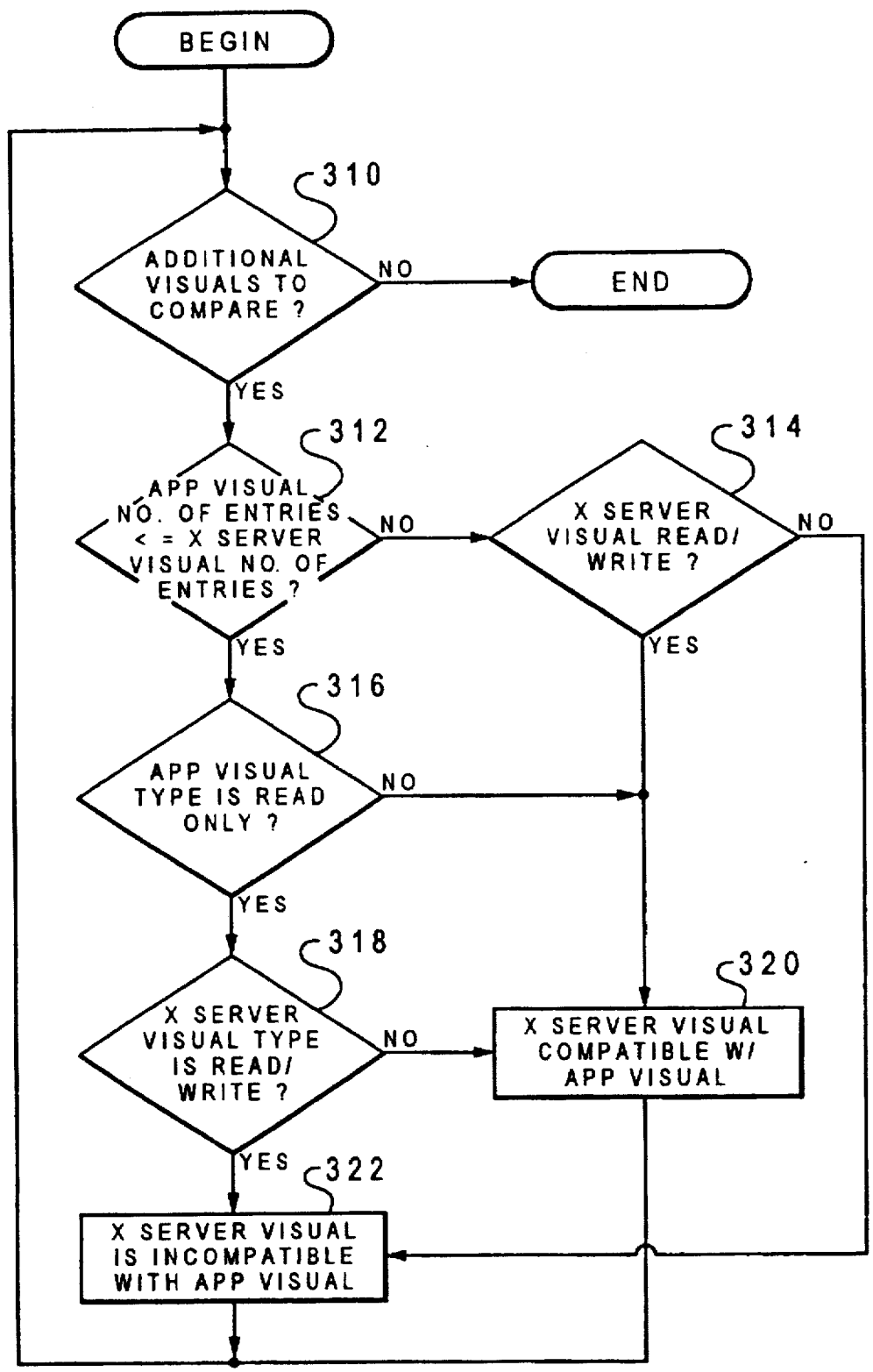
FIG. 3 depicts a block diagram of a flowchart detailing the process to create lists of available compatible and incompatible visual types.

FIG. 3 depicts a block diagram of a flowchart detailing the process to create lists of available compatible and incompatible visual types. In step 310, the system determines if there are any or more X server visual types to compare. If so, in step 312, the system then determines whether the application visual number of entries is less than or equal to the X server visual number of entries, and if so, then proceeds to step 316. Otherwise, the system proceeds to step 314 where the system determines whether the X server visual is a read or write function, and if so, proceeds to step 320, otherwise, it proceeds to step 322.

In step 316, the system determines whether the application visual type is a read only operation. If the application visual type is a read only, the system proceeds to step 318, where it determines if the X server visual type is a read/write type. If the application visual type is neither a read nor a read/write type, then the system proceeds to step 320, where the system determines if the X server visual type is compatible with the application visual type. If the application visual type is a read only and a read/write type, then the system, in step 322, determines that the X server visual is incompatible with the application visual type and then returns to step 310 to continue processing for additional X server visual types to be compared.

While the invention has been particularly shown and described with reference to a preferred embodiment, it will be understood by those skilled in the art that various changes in form and detail may be made therein without departing from the spirit and scope of the invention.

We claim:

1. In a conference enabled windows network system, a method for determining the best match available for a conference owner's visual type for each server connected to said windows network system, comprising the steps of:

determining if a default visual type for said server is available to match said conference owner's default visual type;

determining if a participant has an available visual type compatible with said conference owner's visual type; and matching said visual type of said participant to a visual type most compatible to said owner's visual type.

2. The method according to claim 1 further comprising the step of:

removing a matched visual type from a list of available visual types.

3. The method according to claim 1 wherein said step of matching to the closest compatible visual type available further comprises the steps of:

determining if there is an exact match of visual types; and upon determining there is an exact match visual type, matching said exact match to the owner's visual type.

4. The method according to claim 1 further comprising the step of:

upon determining said visual type is incompatible with said owner's visual type, matching to a closest incompatible visual type available.

5. The invention according to claim 1 further comprising the step of providing an error condition in the event that either a compatible or incompatible visual type is not available.

6. In a conference enabled windows network system having a plurality of X servers, one of said X servers receiving an application on said network system, a method of generating a list of available compatible visual types comprising the steps of:

determining if said application's visual type has the same number or fewer number of independent entries as that of said X server;

if so, determining if an available visual type for a particular X server is read only or if the application's visual type is read/write; and if not, determining if an available visual type for a particular X server is read only.

7. The method according to claim 6 further comprising the step of:

determining the particular X server's visual type based on its compatibility with the application's visual type.

8. In a conference enabled windows network system having a plurality of X servers, one of said X servers receiving an application on said network system, a method of generating a list of available incompatible visual types comprising the steps of:

determining if said application's visual type has the same number or fewer number of independent entries as that of the X server;

if so, determining if the application's visual type is read only and if a particular X server's visual type is read/write; and if not, determining if the particular X server's visual type is read/write.

9. The method according to claim 8 further comprising the step of:

determining the particular X server's visual type based on its compatibility with the application's visual type.

* * * * *